(12) United States Patent
Datta Gupta et al.

(10) Patent No.: US 11,260,867 B2
(45) Date of Patent: Mar. 1, 2022

(54) HYDROPLANING PREVENTION

(71) Applicant: Ford Global Technologies, LLC, Dearborn, MI (US)

(72) Inventors: Somak Datta Gupta, Novi, MI (US); Mahmoud Yousef Ghannam, Canton, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 16/595,775

(22) Filed: Oct. 8, 2019

(65) Prior Publication Data

US 2021/0101601 A1   Apr. 8, 2021

(51) Int. Cl.
| | |
|---|---|
| *B60W 30/18* | (2012.01) |
| *B60W 10/20* | (2006.01) |
| *B60W 10/10* | (2012.01) |
| *B60W 10/04* | (2006.01) |
| *B60W 30/16* | (2020.01) |

(52) U.S. Cl.
CPC ...... *B60W 30/18172* (2013.01); *B60W 10/04* (2013.01); *B60W 10/10* (2013.01); *B60W 10/20* (2013.01); *B60W 30/16* (2013.01); *B60W 2555/20* (2020.02); *B60W 2710/10* (2013.01); *B60W 2710/20* (2013.01); *B60W 2720/106* (2013.01); *B60W 2754/10* (2020.02)

(58) Field of Classification Search
CPC .......... B60W 30/18172; B60W 10/20; B60W 10/10; B60W 10/04; B60W 30/16; B60W 2555/20; B60W 2754/10; B60W 2710/10; B60W 2710/20; B60W 2720/106
USPC ......................................................... 701/41
See application file for complete search history.

(56) References Cited

U.S. PATENT DOCUMENTS

| | | | |
|---|---|---|---|
| 5,350,035 A | 9/1994 | Bodier et al. | |
| 5,765,119 A * | 6/1998 | Otabe ..................... | B60T 8/172 701/59 |
| 9,493,145 B2 * | 11/2016 | Mehr ....................... | B60T 8/172 |
| 9,571,449 B2 | 2/2017 | Obradovich | |
| 10,549,734 B2 * | 2/2020 | Hofmann .............. | B60W 40/06 |
| 2003/0101805 A1 * | 6/2003 | Raab ....................... | B60T 8/172 73/115.01 |
| 2004/0016870 A1 * | 1/2004 | Pawlicki ................. | G06K 9/52 250/208.1 |
| 2008/0027607 A1 * | 1/2008 | Ertl ........................ | B60W 30/16 701/36 |
| 2008/0245456 A1 * | 10/2008 | Spetler .................. | B60T 8/1725 152/209.1 |
| 2015/0153266 A1 * | 6/2015 | Mack ..................... | G01W 1/14 73/9 |
| 2020/0282999 A1 * | 9/2020 | Mizrachi .............. | B60W 40/08 |

* cited by examiner

*Primary Examiner* — Jonathan M Dager
*Assistant Examiner* — Jean W Charleston
(74) *Attorney, Agent, or Firm* — Frank A. MacKenzie; Bejin Bieneman PLC (57) ABSTRACT

A computer includes a processor and a memory storing instructions executable by the processor to detect a potential hydroplaning area of a roadway based on topographic data and based on vehicle sensor data, and to actuate a component of a vehicle based on a location of the potential hydroplaning area.

20 Claims, 5 Drawing Sheets

FIG. 5

HYDROPLANING PREVENTION

BACKGROUND

Hydroplaning occurs when a layer of water builds between one or more wheels of the vehicle and the surface of the roadway, leading to a loss of traction by the affected wheels. Grooved rubber tires are designed to displace water from beneath the tires, thus providing friction even in wet conditions. When a tire encounters more water than the tire can displace, hydroplaning can occur. Hydroplaning can contribute to a loss of control over a vehicle.

DETAILED DESCRIPTION

The vehicle described herein can help avoid situations that can lead to hydroplaning of the vehicle. The computer can use both data from sensors on board the vehicle along with topographic data to analyze environments for hydroplaning risk and can thus actuate components of the vehicle to mitigate that hydroplaning risk.

A computer includes a processor and a memory storing instructions executable by the processor to detect a potential hydroplaning area of a roadway based on topographic data and on vehicle sensor data, and actuate a component of a vehicle based on a location of the potential hydroplaning area.

The instructions may further include to generate an alternate route in response to data indicating that the roadway is impassable from waterlogging.

Actuating the component may include steering a vehicle around the potential hydroplaning area.

Detecting the potential hydroplaning area may include determining that a portion of the roadway is at least a threshold depth below standing water based on the topographic data and on the vehicle sensor data.

The topographic data may include a slope of the roadway in a lateral direction from an edge of the roadway to a middle of the roadway.

The instructions may further include to actuate a second component of the vehicle in response to determining that the roadway is passable. Actuating the second component may include at least one of disabling a cruise control, shifting to a lower gear, increasing a following distance, or lowering a vehicle speed.

Detecting the potential hydroplaning area may occur in response to a waterlogging trigger event. The waterlogging trigger event may be at least one of weather data indicating a flood warning, weather data indicating precipitation above a threshold, a message from a remote server indicating that a second vehicle experienced hydroplaning on the roadway, or sensor data indicating standing water in the roadway.

The instructions may include to send sensor data to a remote server in response to data indicating that the roadway is impassable from waterlogging or in response to hydroplaning occurring.

A method includes detecting a potential hydroplaning area of a roadway based on topographic data and on vehicle sensor data, and actuating a component of a vehicle based on a location of the potential hydroplaning area.

The method may further include generating an alternate route in response to data indicating that the roadway is impassable from waterlogging.

Actuating the component may include steering a vehicle around the potential hydroplaning area.

Detecting the potential hydroplaning area may include determining that a portion of the roadway is at least a threshold depth below standing water based on the topographic data and on the vehicle sensor data.

The topographic data may include a slope of the roadway in a lateral direction from an edge of the roadway to a middle of the roadway.

The method may further include actuating a second component of the vehicle in response to determining that the roadway is passable. Actuating the second component may include at least one of disabling a cruise control, shifting to a lower gear, increasing a following distance, or lowering a vehicle speed.

Detecting the potential hydroplaning area may occur in response to a waterlogging trigger event. The waterlogging trigger event may be at least one of weather data indicating a flood warning, weather data indicating precipitation above a threshold, a message from a remote server indicating that a second vehicle experienced hydroplaning on the roadway, or sensor data indicating standing water in the roadway.

The method may further include sending sensor data to a remote server in response to data indicating that the roadway is impassable from waterlogging or in response to hydroplaning occurring.

With reference to the Figures, a computer 30 includes a processor and a memory storing instructions executable by the processor to detect a potential hydroplaning area 32 of a roadway 34 based on topographic data and on vehicle sensor data, and actuate at least one component 36 of a vehicle 38 based on a location of the potential hydroplaning area 32.

Figure 1:
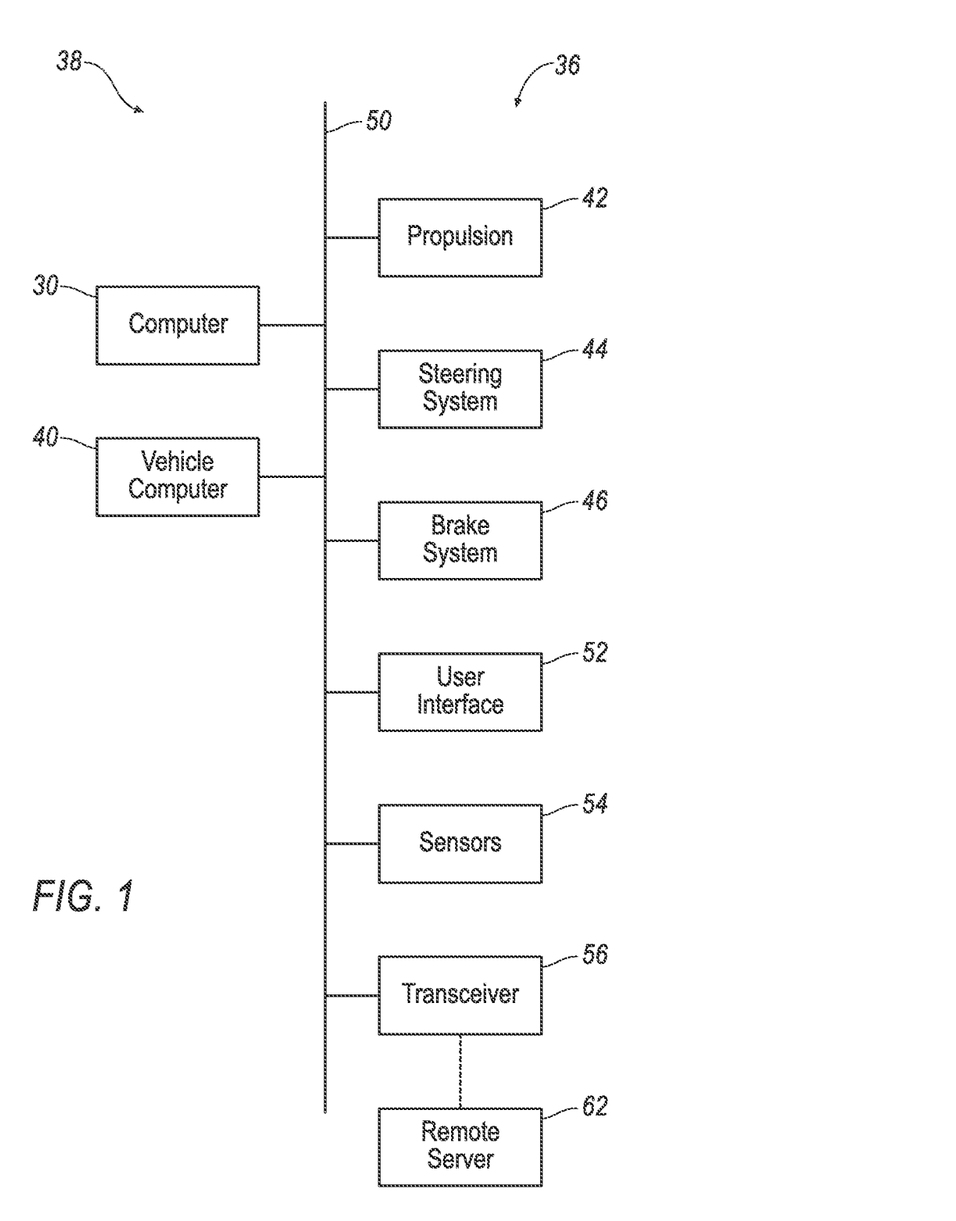
FIG. 1 is a block diagram of an example vehicle and remote server.

With reference to FIG. 1, the vehicle 38 may be any passenger or commercial automobile such as a car, a truck, a sport utility vehicle, a crossover, a van, a minivan, a taxi, a bus, etc.

The vehicle 38 may be an autonomous vehicle. A vehicle computer 40 can be programmed to operate the vehicle 38 independently of the intervention of a human driver, completely or to a lesser degree. The vehicle computer 40 may be programmed to operate the propulsion 42, steering system 44, brake system 46, and/or other vehicle systems. For the purposes of this disclosure, autonomous operation means the vehicle computer 40 controls the propulsion 42, steering system 44, and brake system 46 without input from a human driver; semi-autonomous operation means the vehicle computer 40 controls one or two of the propulsion 42, steering system 44, and brake system 46 and a human driver controls the remainder; and nonautonomous operation means a human driver controls the propulsion 42, steering system 44, and brake system 46.

The vehicle computer 40 is a microprocessor-based controller. The vehicle computer 40 includes a processor, a memory, etc. The memory of the vehicle computer 40 includes media for storing instructions executable by the processor as well as for electronically storing data and/or databases.

The computer 30 is a microprocessor-based controller. The computer 30 includes a processor, a memory, etc. The memory of the computer 30 includes media for storing instructions executable by the processor as well as for electronically storing data and/or databases. The computer 30 can be comprised of one or more electronic control modules or units (ECMs or ECUs) and/or the vehicle computer 40.

The computer 30 may transmit and receive data through a communications network 50 such as a controller area network (CAN) bus, Ethernet, WiFi, Local Interconnect Network (LIN), onboard diagnostics connector (OBD-II), and/or by any other wired or wireless communications network. The computer 30 may be communicatively coupled to the vehicle computer 40, a user interface 52, the propulsion 42, the steering system 44, the brake system 46, sensors 54, a transceiver 56, and other components 36 via the communications network 50.

The user interface 52 presents information to and receives information from an occupant of the vehicle 38. The user interface 52 may be located, e.g., on an instrument panel in a passenger cabin of the vehicle 38, or wherever may be readily seen by the occupant. The user interface 52 may include dials, digital readouts, screens, speakers, and so on for providing information to the occupant, e.g., human-machine interface (HMI) elements such as are known. The user interface 52 may include buttons, knobs, keypads, microphone, and so on for receiving information from the occupant.

The propulsion 42 of the vehicle 38 generates energy and translates the energy into motion of the vehicle 38. The propulsion 42 may be a conventional vehicle propulsion subsystem, for example, a conventional powertrain including an internal-combustion engine coupled to a transmission that transfers rotational motion to wheels 48; an electric powertrain including batteries, an electric motor, and a transmission that transfers rotational motion to the wheels 48; a hybrid powertrain including elements of the conventional powertrain and the electric powertrain; or any other type of propulsion. The propulsion 42 can include an electronic control unit (ECU) or the like that is in communication with and receives input from the vehicle computer 40 and/or a human driver. The human driver may control the propulsion 42 via, e.g., an accelerator pedal and/or a gearshift lever.

The steering system 44 is typically a conventional vehicle steering subsystem and controls the turning of the wheels 48. The steering system 44 may be a rack-and-pinion system with electric power-assisted steering, a steer-by-wire system, as are both known, or any other suitable system. The steering system 44 can include an electronic control unit (ECU) or the like that is in communication with and receives input from the vehicle computer 40 and/or a human driver. The human driver may control the steering system 44 via, e.g., a steering wheel.

The brake system 46 is typically a conventional vehicle braking subsystem and resists the motion of the vehicle 38 to thereby slow and/or stop the vehicle 38. The brake system 46 may include friction brakes such as disc brakes, drum brakes, band brakes, etc.; regenerative brakes; any other suitable type of brakes; or a combination. The brake system 46 can include an electronic control unit (ECU) or the like that is in communication with and receives input from the vehicle computer 40 and/or a human driver. The human driver may control the brake system 46 via, e.g., a brake pedal.

Figure 2:
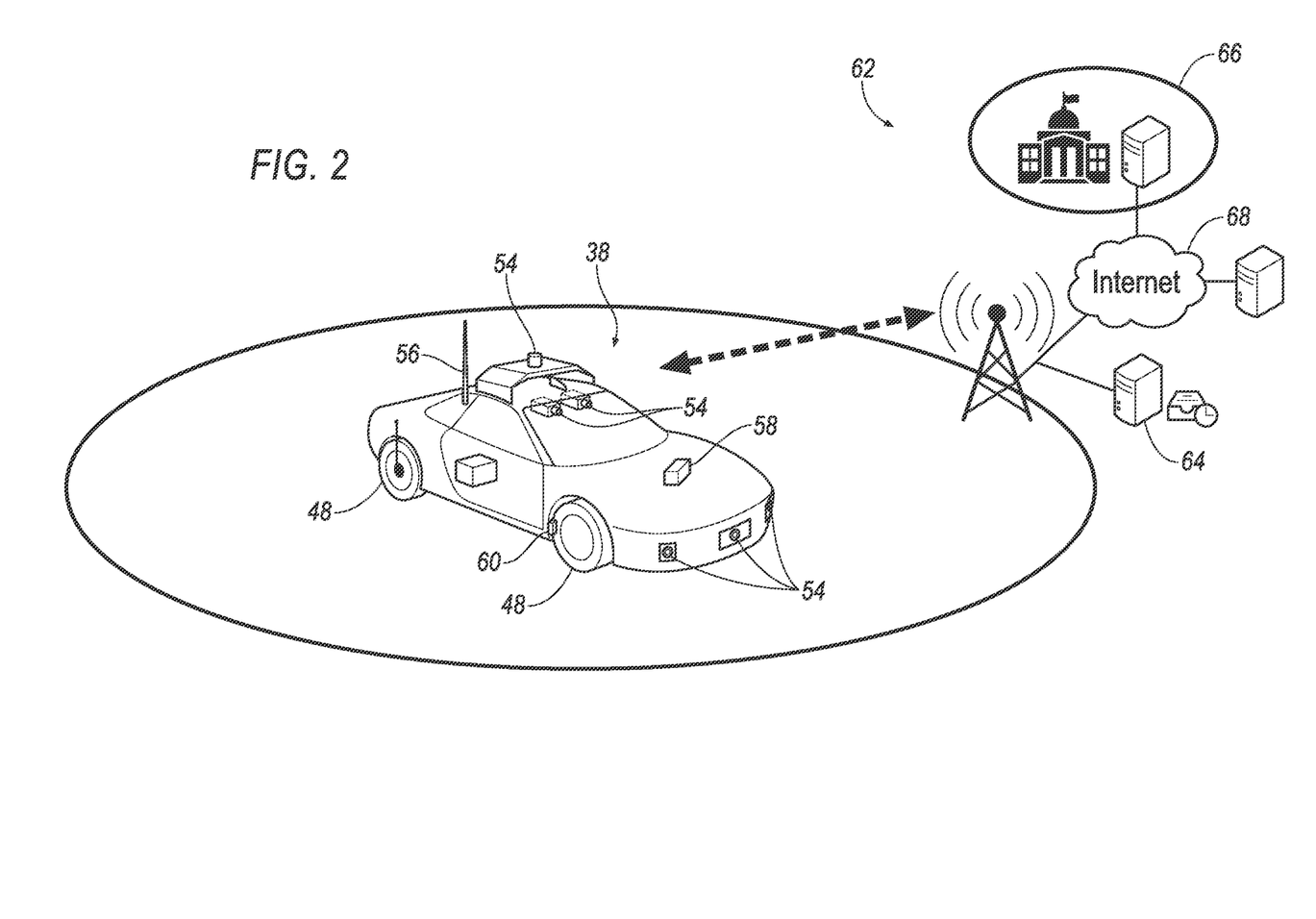
FIG. 2 is a diagram of the vehicle and the remote server.

With reference to FIGS. 1 and 2, the vehicle 38 includes the sensors 54. The sensors 54 can provide data about operation of the vehicle 38, for example, wheel speed, wheel orientation, and engine and transmission data (e.g., temperature, fuel consumption, etc.). The sensors 54 can detect the location and/or orientation of the vehicle 38. For example, the sensors 54 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 54 can detect the external world, e.g., objects and/or characteristics of surroundings of the vehicle 38, such as other vehicles, road lane markings, traffic lights and/or signs, pedestrians, etc. For example, the sensors 54 can include radar sensors, ultrasonic sensors, scanning laser range finders, light detection and ranging (LIDAR) devices, and image processing sensors such as cameras.

The sensors 54 can include a retroreflective water-depth sensor 58 and/or an accelerometer-based water-depth sensor 60. The retroreflective water-depth sensor 58 includes a frequency-modulated light source and one or more photodiode receivers. The light source generates near-infrared light aimed at the roadway 34. The photodiode receivers detect the retroreflected light generated by the light source and reflected off the roadway 34. The retroreflective water-depth sensor 58 can generate spectrum data of the received light, which correlates with water depth. The data transmitted by the retroreflective water-depth sensor 58 thus provides a water depth to the computer 30.

The accelerometer-based water-depth sensor 60 can be positioned in a wheelwell of the vehicle 38 behind one of the wheels 48 of the vehicle 38. The accelerometer-based water-depth sensor 60 can measure vibrations caused by water droplets created by the wheel 48 driving through a wetted area of the roadway 34. For a given speed of the vehicle 38, vibration data from the accelerometer-based water-depth sensor 60 is correlated with water depth. The data transmitted by the accelerometer-based water-depth sensor 60 thus provides a water depth to the computer 30.

The transceiver 56 may be adapted to transmit signals wirelessly through any suitable wireless communication protocol, such as Bluetooth®, WiFi, IEEE 802.11a/b/g, other RF (radio frequency) communications, etc. The transceiver 56 may be adapted to communicate with a remote server 62, that is, a server distinct and spaced from the vehicle 38. The remote server 62 is located outside the vehicle 38. The transceiver 56 may be one device or may include a separate transmitter and receiver.

With reference to FIG. 2, the remote server 62 can be or include an edge server 64 and/or a central server 66. The central server 66 and the edge server 64 can each include a server and a data store. The transceiver 56 can communicate with the edge server 64 using, e.g., Dedicated Short-Range Communications (DSRC) or the like (i.e., according to what is often referred to as vehicle-to-infrastructure, or V2I, communications). The central server 66 and the edge server 64 can communicate with each other over a network 68. The network 68 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services. The edge server 64 can store cached data that can be accessed by the vehicle 38 or by other vehicles via V2I communications without needing to transmit over the network 68.

Figure 3:
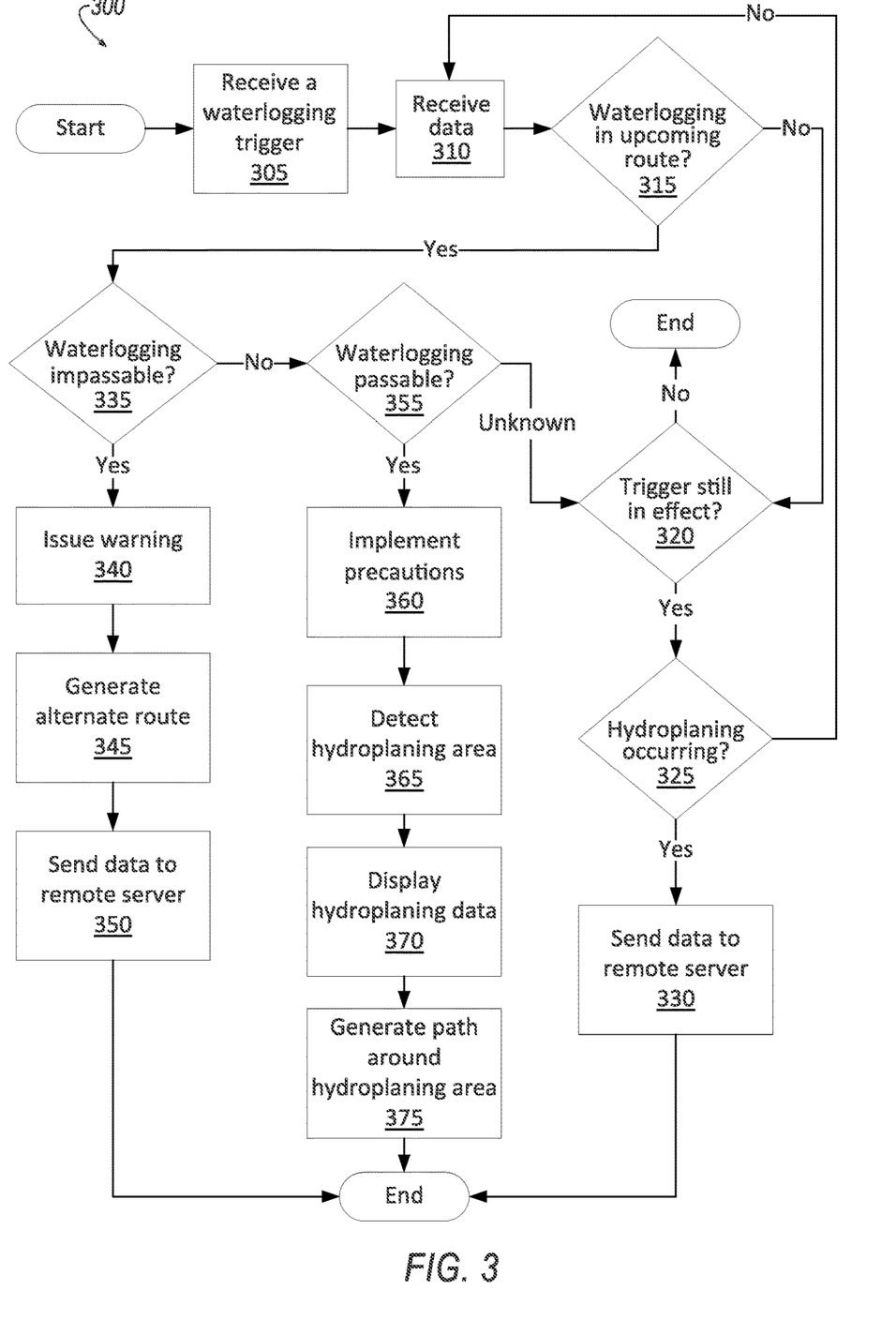
FIG. 3 is a process flow diagram of an example process for responding to a waterlogging trigger.

FIG. 3 is a process flow diagram illustrating an exemplary process 300 for responding to a waterlogging trigger event. For the purposes of this disclosure, "waterlogging trigger event" is defined as data indicating an increased risk of waterlogging, and "waterlogging" is defined as sufficient standing water on the roadway 34 that the vehicle 38 should drive around the standing water. As a general overview of the process 300, in response to a waterlogging trigger, the computer 30 generates an alternate route in response to the roadway 34 along a route being impassable; implements precautions and detects and generates a path 70 around a potential hydroplaning area 32 in response to the roadway 34 along the route being waterlogged but passable; and checks whether the waterlogging trigger is still in place in response to no known waterlogging in the route. The memory of the computer 30 stores executable instructions for performing the steps of the process 300.

The process 300 begins in a block 305 with the computer 30 receiving the waterlogging trigger event. For example, the waterlogging trigger event can be weather data indicating a flood warning, e.g., a flood warning or flood watch issued by a private or governmental entity such as the National Weather Service. For another example, the waterlogging trigger event can be weather data indicating precipitation, either forecasted in the near future or actual, above a threshold within a time period. The threshold and time period can be chosen based on a risk of waterlogging given different amounts of precipitation over different time periods, e.g., three inches of rain over a 12- or 24-hour period. For another example, the waterlogging trigger event can be a message from the remote server 62 indicating that a second vehicle experienced hydroplaning on the roadway 34. The second vehicle could have sent data of the hydroplaning to the edge server 64 (as the vehicle 38 does in a block 330 described below), and the edge server 64 can send that data to nearby vehicles including the vehicle 38. For another example, the waterlogging trigger event can be sensor data indicating standing water in the roadway 34. In particular, for example, the sensor data indicating standing water can be image data showing a reflection, i.e., an area of pixels that is identical or nearly identical to another area of pixels reversed over a horizontal line. The horizontal line can be within a vertical range at which the horizon could be. The area of pixels may need to be above a threshold horizontal distance, which can be chosen to indicate that the standing water constitutes waterlogging, e.g., based on experimental data showing what size of standing water the vehicle should navigate around rather than driving through (such as with a puddle). For another example, the sensor data indicating standing water in the roadway 34 can be data from the retroreflective water-depth sensor 58 or data from the accelerometer-based water-depth sensor 60, as described above, indicating standing water above a threshold depth, which can be chosen to indicate that the standing water constitutes waterlogging, e.g., based on experimental data showing how deep standing water the vehicle should navigate around rather than driving through.

Next, in a block 310, the computer 30 receives data from the sensors 54 and from the transceiver 56. The data includes data from the sensors 54 and data from the remote server 62 received via the transceiver 56.

Next, in a block 315, the computer 30 determines whether waterlogging is present in an upcoming route. The upcoming route is a set of directions to follow particular roadways to a final destination. Some but not necessarily all waterlogging trigger events from the block 305 also demonstrate that waterlogging is present in the upcoming route. For example, the computer 30 can determine that waterlogging is present in the upcoming route based on the message from the remote server 62 indicating that a second vehicle experienced hydroplaning on the roadway 34. For another example, the computer 30 can determine that waterlogging is present from sensor data indicating standing water in the roadway 34. The sensor data indicating standing water can be image data showing a reflection, i.e., an area of pixels that is identical or nearly identical to another portion of pixels reversed over a horizontal line; data from the retroreflective water-depth sensor 58; data from the accelerometer-based water-depth sensor 60; etc., as described above with respect to the block 305. Differently from the waterlogging trigger events for the block 305, the computer 30 can determine that waterlogging is present from weather data indicating that, e.g., flooding has occurred along the upcoming route (as opposed to a flood watch or warning for a geographic area including the upcoming route). If waterlogging is present in the upcoming route, the process 300 proceeds to a decision block 335. If waterlogging is not confirmed in the upcoming route, the process proceeds to a decision block 320.

In the decision block 320, the computer 30 determines whether the waterlogging trigger event is still in effect. For example, if the waterlogging trigger event is weather data indicating a flood warning or watch, the computer 30 checks whether the flood warning or watch is still in effect. For another example, some types of waterlogging trigger events can be deemed to expire after a set duration elapsed or distance traveled if no newer waterlogging trigger events occur; e.g., a message indicating that a second vehicle hydroplaned or sensor data indicating standing water in the roadway 34. The set duration can be chosen based on typical times for flooding events to pass. The set distance is a distance from the location associated with the waterlogging trigger event, e.g., the location at which the second vehicle hydroplaned or the location of the standing water. The set distance can be chosen based on a typical spatial extent of flooding events. If the waterlogging trigger is still in effect, the process 300 proceeds to a decision block 325. If the waterlogging trigger event is no longer in effect, the process 300 ends.

In the decision block 325, the computer 30 determines whether hydroplaning is currently occurring to the vehicle 38. "Hydroplaning" means a layer of water builds between one or more wheels 48 of the vehicle 38 and the surface of the roadway 34, potentially leading to a loss of traction. The computer 30 can determine that hydroplaning is occurring by, e.g., detecting that skidding is occurring while the waterlogging trigger event is still active. Detecting skidding can be performed by electronic stability control (ESC) incorporating the sensors 54, as is known. If hydroplaning is not occurring, the process 300 returns to the block 310 to continue receiving data. If hydroplaning is occurring, the process 300 proceeds to a block 330.

In the block 330, the computer 30 sends data from the sensors 54 to the remote server 62. The data can include the location at which the hydroplaning occurred, along with sensor data gathered while the vehicle 38 was at that location, i.e., gathered during the hydroplaning. After the block 330, the process 300 ends.

Figure 4:
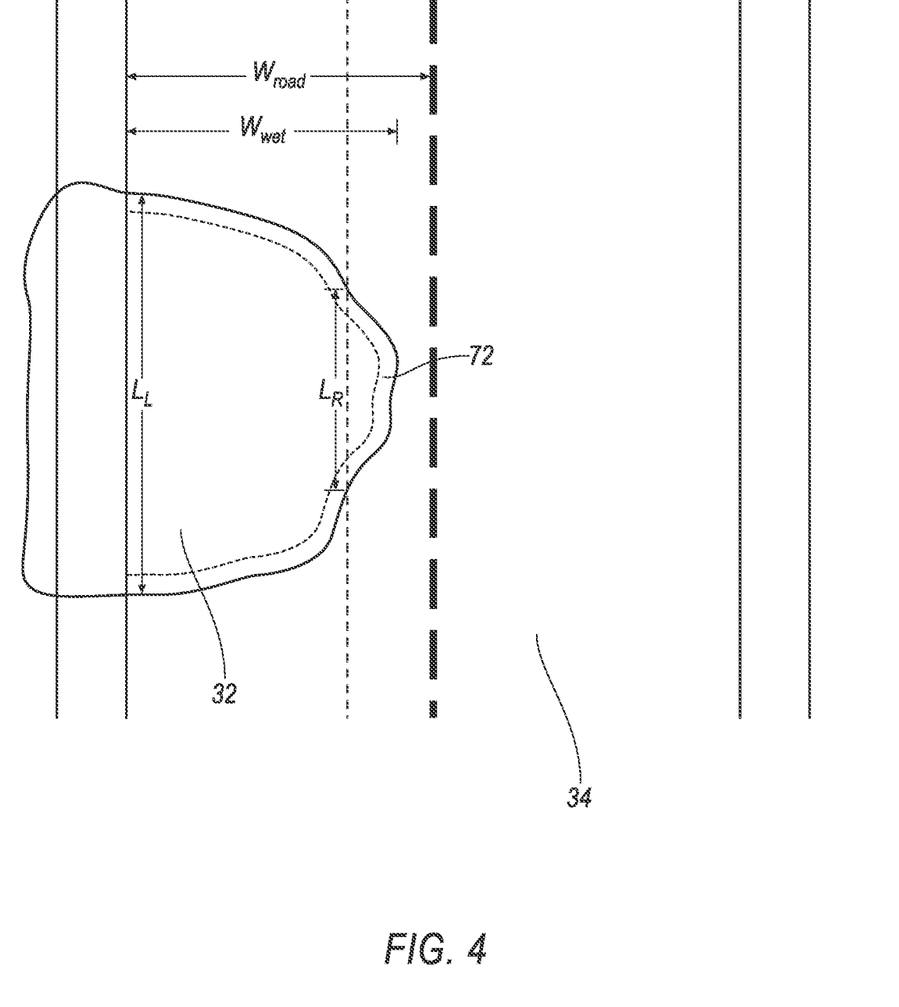
FIG. 4 is a top-view diagram of a waterlogged roadway.

In the decision block 335, the computer 30 determines whether the roadway 34 is impassable from waterlogging. Whether the roadway 34 is impassable can be determined based on vehicle sensor data about a standing-water area 72 in the roadway 34, along with topographic data. The shape and location of the standing-water area 72 can be identified by, e.g., image data showing a reflection, i.e., an area of pixels that is identical or nearly identical to another portion of pixels reversed over a horizontal line. Using sensor fusion of the image data with three-dimensional data such as LIDAR data, e.g., according to existing techniques for interpreting camera image data and LIDAR data, the location in the environment can be determined corresponding to the reflection area in the image data. Additionally or alternatively, the computer 30 can compare the topographic data with the current three-dimensional data to find horizontally flat areas that deviate from the height according to the topographic data. The topographic data can be stored in the memory of the vehicle 38. The topographic data can be generated by the sensors 54, e.g., LIDAR sensors, time-of-flight (TOF) cameras, and/or stereo cameras, while previously driving on the same roadway 34. The computer 30 can determine that the roadway 34 is impassable by, for example, determining that a metric of the standing-water area 72 is above a threshold. With reference to FIG. 4, a first metric is the ratio of a distance $W_{wet}$ of the standing water in a lateral, i.e., cross-roadway, direction to a width $W_{road}$ of a lane of the roadway 34, i.e., $W_{wet}/W_{road}$, and a first threshold corresponding to the first metric can be 1; in other words, if the standing water extends across at least one lane of the roadway 34, then the roadway 34 is impassable. A second metric is the ratio of a longitudinal distance $L_R$ (i.e., a distance in the direction of travel along the roadway 34, i.e., perpendicular to the cross-roadway direction) measured at a fixed cross-lane position within a lane of the roadway 34 to a longitudinal distance $L_L$ at the edge of the lane bordering the shoulder or curb of the roadway 34, i.e., $L_R/L_L$, and a second threshold corresponding to the second metric can be chosen based on a risk that the roadway 34 is impassable, e.g., 0.5. The roadway 34 can be deemed impassable if either or both of the metrics are above their respective thresholds, and the roadway 34 can be deemed passable if both or either metrics are below their respective thresholds. If the roadway 34 is impassable, the process 300 proceeds to a block 340. If the roadway 34 is passable (or if the data from the sensors 54 does not permit a determination of the metrics), the process 300 proceeds to a decision block 355.

In the block 340, the computer 30 instructs the user interface 52 to display a warning to the occupant of the vehicle 38 that the roadway 34 is impassable. The warning can be a message on a digital readout, an auditory message, or both.

Next, in a block 345, the computer 30 generates an alternate route to the upcoming route. The computer 30 can use known route-planning algorithms for generating a route from the current location of the vehicle 38 to the final destination subject to constraints precluding some roads. In particular, one constraint is avoiding the current roadway 34. An additional constraint can be avoiding other locations at which waterlogging or hydroplaning have been reported.

Next, in a block 350, the computer 30 sends data from the sensors 54 to the remote server 62. The data can include the location of the impassable waterlogging, along with the sensor data of the standing water forming the impassable waterlogging. After the block 350, the process 300 ends.

In the decision block 355, the computer 30 determines whether the roadway 34 is passable or whether there is insufficient data to determine whether the roadway 34 is passable, i.e., whether there is insufficient data to calculate $W_{wet}$, $W_{road}$, $L_R$, and $L_L$, as described above in the decision block 335. If the roadway 34 is passable, the process proceeds to a block 360. If there is insufficient data, the process 300 proceeds to the decision block 320 described above.

In the block 360, the computer 30 actuates components 36 of the vehicle 38 in order to implement precautions for the waterlogged area. For example, the computer 30 can disable, e.g., turn off, a cruise control of the vehicle 38. In other words, if the vehicle 38 is being nonautonomously operated, the computer 30 can require that the occupant use the accelerator pedal to continuously provide acceleration input; if the vehicle 38 is being autonomously operated, the vehicle computer 40 can use varying speeds based on environmental factors instead of proceeding at, e.g., a speed limit of the roadway 34. For another example, the vehicle 38 can shift to a lower gear. For another example, the computer 30 can increase a following distance. In other words, if the vehicle 38 is being autonomously driven or semi-autonomously driven (e.g., using adaptive cruise control), the vehicle 38 stays farther back from a vehicle in front of the vehicle 38 than a default following distance. For another example, the computer 30 can lower the speed of the vehicle 38.

Next, in a block 365, the computer 30 detects the potential hydroplaning area 32 of the roadway 34 based on the sensor data and the topographic data. The topographic data can include altitude data for a middle of the roadway 34 or a designated lateral location of the roadway 34 as well as a slope of the roadway 34 in a lateral direction between an edge of the roadway 34 (i.e., the portion of the roadway 34 bordering the shoulder or curb) and the middle of the roadway 34, also known as cross slope, cross fall, or camber. The slope of the roadway 34 is typically a constant value along the roadway 34. The slope can be expressed as a percentage of the vertical distance to the lateral distance, e.g., 2%, or as a vertical distance per lateral distance, e.g., ¼ inch per 1 foot. Storing topographic data as altitude data just for the middle of the road along with a constant slope of the road can save memory on board the vehicle 38 and can make calculations easier. The potential hydroplaning area 32 is a subarea of the standing-water area 72 determined above with respect to the decision block 335. The potential hydroplaning area 32 can be an area for which the depth of the standing water is at least a threshold depth. For example, relying on a constant slope for the roadway 34, the potential hydroplaning area 32 can be the standing-water area 72 with a strip toward the middle of the road removed. The width of the strip can be equal to a depth of water through which the vehicle 38 is capable of moving $H_{max}$ divided by the slope m, i.e., $H_{max}/m$.

Next, in a block 370, the computer 30 generates a path 70 around the potential hydroplaning area 32. The path 70 stays within the roadway 34 and goes around the potential hydroplaning area 32. If the vehicle 38 is operating autonomously, the computer 30 instructs the vehicle computer 40 to follow the path 70. The vehicle computer 40 instructs the propulsion 42, the steering system 44, and if necessary the brake system 46 to drive the vehicle 38 along the path 70.

Figure 5:
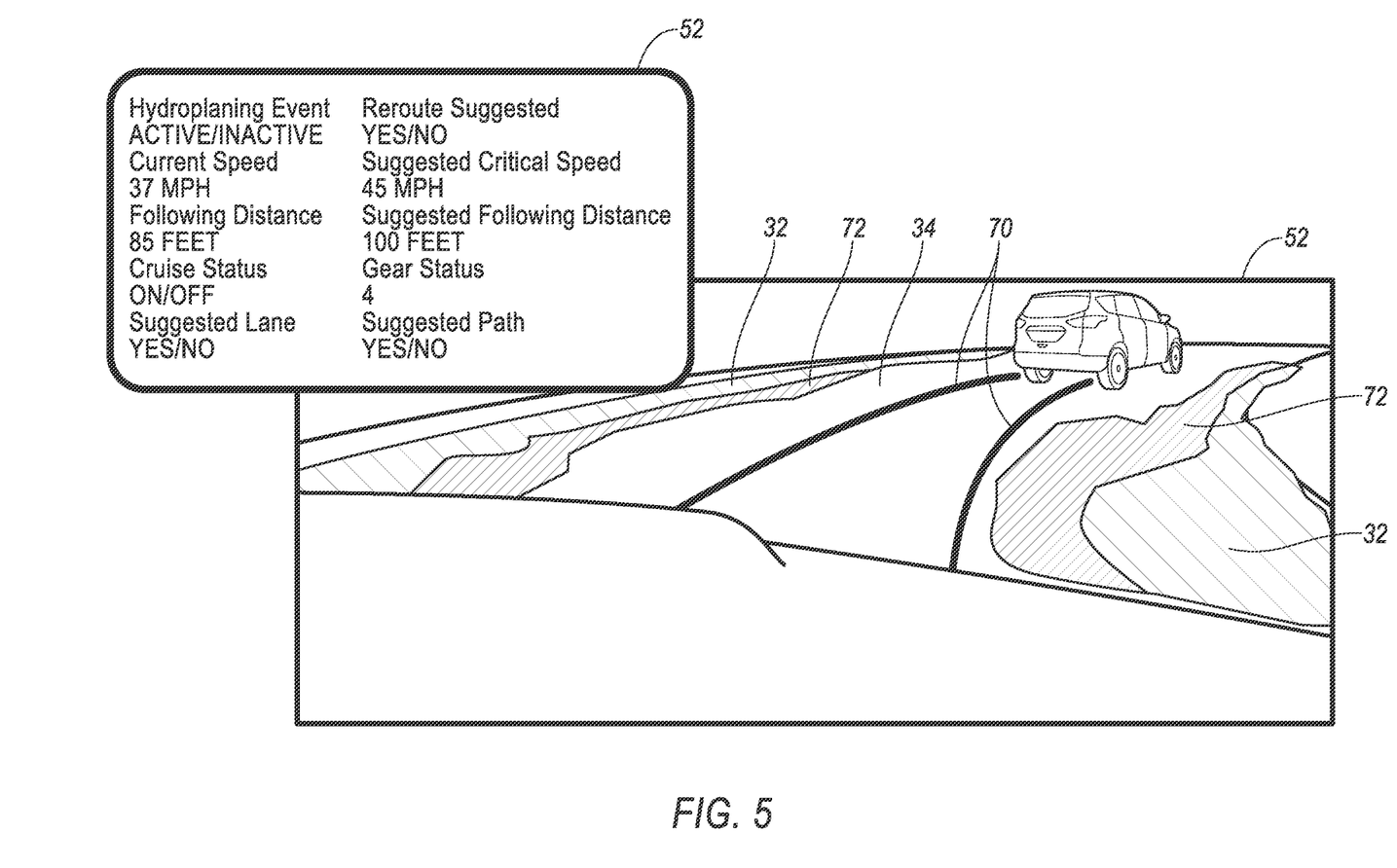
FIG. 5 is a diagram from a point of view of the vehicle of a waterlogged environment through which the vehicle is driving.

Next, in a block 375, the computer 30 instructs the user interface 52 to display hydroplaning data to the occupant. As shown in FIG. 5, the user interface 52 can display the potential hydroplaning area 32, the path 70, and the standing-water area 72 that is not part of the potential hydroplaning area 32, e.g., on a videoscreen or a heads-up-display. The user interface 52 can display the values of variables related to hydroplaning risk, e.g., "Hydroplaning Event," i.e., whether hydroplaning is occurring; "Current Speed" of the vehicle 38; "Following Distance" to a vehicle in front of the vehicle 38; "Cruise Status," i.e., whether the cruise control is active; "Suggested Lane" of the roadway 34 in which to drive the vehicle 38, which can be a lane outside the potential hydroplaning area 32; "Reroute Suggested," i.e., whether an alternate route has been suggested; "Suggested Critical Speed," which is a suggested maximum speed; "Suggested Following Distance" recommended to a vehicle in front of the vehicle 38; "Gear Status"; and "Suggested Path," i.e., whether a suggested path 70 is shown. After the block 375, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   detect a potential hydroplaning area of a roadway based on topographic data and on vehicle sensor data;
   measure a first distance and a second distance across a standing-water area corresponding to the potential hydroplaning area by comparing the vehicle sensor data for the potential hydroplaning area with the topographic data for the potential hydroplaning area;
determine a ratio of the first distance to the second distance;
determine based on the ratio that the roadway is impassable from waterlogging;
actuate a component of a vehicle based on a location of the potential hydroplaning area; and
generate an alternate route upon determining that the roadway is impassable from waterlogging.

2. The computer of claim 1, wherein actuating the component includes steering a vehicle around the potential hydroplaning area.

3. The computer of claim 1, wherein detecting the potential hydroplaning area includes determining that a portion of the roadway is at least a threshold depth below standing water based on the topographic data and on the vehicle sensor data.

4. The computer of claim 1, wherein the topographic data includes a slope of the roadway in a lateral direction from an edge of the roadway to a middle of the roadway.

5. The computer of claim 4, wherein the topographic data is stored in the memory as an altitude of the middle of the roadway and a slope of the roadway.

6. The computer of claim 1, wherein the instructions further include to actuate a second component of the vehicle in response to determining that the roadway is passable.

7. The computer of claim 6, wherein actuating the second component includes at least one of disabling a cruise control, shifting to a lower gear, increasing a following distance, or lowering a vehicle speed.

8. The computer of claim 1, wherein detecting the potential hydroplaning area occurs in response to a waterlogging trigger event.

9. The computer of claim 8, wherein the waterlogging trigger event is at least one of weather data indicating a flood warning, weather data indicating precipitation above a threshold, a message from a remote server indicating that a second vehicle experienced hydroplaning on the roadway, or sensor data indicating standing water in the roadway.

10. The computer of claim 1, wherein the instructions include to send sensor data to a remote server in response to data indicating that the roadway is impassable from waterlogging or in response to hydroplaning occurring.

11. The computer of claim 1, wherein the first distance is a width of the standing-water area in a cross-roadway direction, and the second distance is a width of the roadway.

12. The computer of claim 1, wherein the first distance is a longitudinal distance measured at a fixed cross-lane position within a lane of the roadway, and the second distance is a longitudinal distance measured at an edge of the lane.

13. The computer of claim 1, wherein the instructions further include to instruct a user interface to display the potential hydroplaning area.

14. A method comprising:
detecting a potential hydroplaning area of a roadway based on topographic data and on vehicle sensor data;
measuring a first distance and a second distance across a standing-water area corresponding to the potential hydroplaning area by comparing the vehicle sensor data for the potential hydroplaning area with the topographic data for the potential hydroplaning area;
determining a ratio of the first distance to the second distance;
determining based on the ratio that the roadway is impassable from waterlogging;
actuating a component of a vehicle based on a location of the potential hydroplaning area; and
generating an alternate route upon determining that the roadway is impassable from waterlogging.

15. The method of claim 14, wherein actuating the component includes steering a vehicle around the potential hydroplaning area.

16. The method of claim 14, wherein detecting the potential hydroplaning area includes determining that a portion of the roadway is at least a threshold depth below standing water based on the topographic data and on the vehicle sensor data.

17. The method of claim 14, wherein the topographic data includes a slope of the roadway in a lateral direction from an edge of the roadway to a middle of the roadway.

18. The method of claim 14, further comprising actuating a second component of the vehicle in response to determining that the roadway is passable.

19. The method of claim 18, wherein actuating the second component includes at least one of disabling a cruise control, shifting to a lower gear, increasing a following distance, or lowering a vehicle speed.

20. The method of claim 14, wherein detecting the potential hydroplaning area occurs in response to a waterlogging trigger event.

* * * * *